(12) United States Patent
Barajas Gonzalez et al.

(10) Patent No.: US 11,194,676 B2
(45) Date of Patent: Dec. 7, 2021

(54) DATA SYNCHRONIZATION IN HIGH AVAILABILITY STORAGE ENVIRONMENTS

(71) Applicant: International Business Machines Corporation, Armonk, NY (US)

(72) Inventors: Emmanuel Barajas Gonzalez, Guadalajara (MX); Lourie Goodall, Tucson, AZ (US); Edward Lin, Tucson, AZ (US); Joseph M. Swingler, Phoenix, AZ (US)

(73) Assignee: International Business Machines Corporation, Armonk, NY (US)

( * ) Notice: Subject to any disclaimer, the term of this patent is extended or adjusted under 35 U.S.C. 154(b) by 282 days.

(21) Appl. No.: 16/364,681

(22) Filed: Mar. 26, 2019

(65) Prior Publication Data

US 2020/0310927 A1 Oct. 1, 2020

(51) Int. Cl.
*G06F 16/00* (2019.01)
*G06F 11/16* (2006.01)
(Continued)

(52) U.S. Cl.
CPC ...... *G06F 11/1662* (2013.01); *G06F 11/1469* (2013.01); *G06F 11/2094* (2013.01); *H04L 67/1097* (2013.01)

(58) Field of Classification Search
CPC ............. G06F 11/1662; G06F 11/2094; G06F 11/1469; G06F 11/1471; G06F 11/1658;
(Continued)

(56) References Cited

U.S. PATENT DOCUMENTS 7,433,898 B1 * 10/2008 Georgiev .............. G06F 11/203
7,451,163 B2    11/2008 Daniel
(Continued)

FOREIGN PATENT DOCUMENTS

WO   WO-2014150986 A1 *  9/2014 .......... G06F 11/1464
WO   WO2017096977 A1     6/2017

OTHER PUBLICATIONS

Stage, Alexander, "Synchronization and Replication in the Context of Mobile Applications," 2005, available at: https://www.researchgate.net/publication/228724769_Synchronization_and_replication_in_the_context_of_mobile_applications.
(Continued)

*Primary Examiner* — Syed H Hasan
(74) *Attorney, Agent, or Firm* — Nelson IP; Daniel P. Nelson

(57) ABSTRACT

A method for resynchronizing data repositories in a high availability storage environment includes maintaining, in a first gateway server, a first journal that records operations that are performed for a first set of objects. The method further maintains, in a second gateway server, a second journal that records operations that are performed for a second set of objects. The method communicates, from the first gateway server to the second gateway server, any operations that are performed by the first gateway server for objects in the second set, so that these operations may be recorded in the second journal. The method further communicates, from the second gateway server to the first gateway server, any operations that are performed by the second gateway server for objects in the first set, so that these operations may be recorded in the first journal. A corresponding system and computer program product are also disclosed.

20 Claims, 7 Drawing Sheets

(51) Int. Cl.
*H04L 29/08* (2006.01)
*G06F 11/20* (2006.01)
*G06F 11/14* (2006.01)

(58) Field of Classification Search
CPC ..... H04L 67/1097; H04L 69/40; H04L 67/28; H04L 67/1095
See application file for complete search history.

(56) References Cited

U.S. PATENT DOCUMENTS

| | | | |
|---|---|---|---|
| 8,250,323 B2 | 8/2012 | Benhase et al. | |
| 8,260,742 B2 | 9/2012 | Cognigni et al. | |
| 8,429,362 B1* | 4/2013 | Natanzon | G06F 11/2074 711/162 |
| 8,996,572 B2* | 3/2015 | Wakefield | H04L 61/1576 707/782 |
| 2002/0188711 A1* | 12/2002 | Meyer | G06F 3/0632 709/223 |
| 2004/0193945 A1* | 9/2004 | Eguchi | G06F 11/142 714/6.1 |
| 2005/0165906 A1* | 7/2005 | Deo | H04L 41/5054 709/217 |
| 2005/0223267 A1 | 10/2005 | Akira | |
| 2005/0251540 A1* | 11/2005 | Sim-Tang | G06F 16/2358 |
| 2007/0198602 A1 | 8/2007 | David | |
| 2007/0220311 A1* | 9/2007 | Lewin | G06F 11/1471 714/6.32 |
| 2009/0150627 A1 | 6/2009 | Thomas | |
| 2012/0203781 A1* | 8/2012 | Wakefield | H04L 29/12169 707/736 |
| 2016/0269481 A1* | 9/2016 | Holt | H04L 67/06 |
| 2017/0286362 A1* | 10/2017 | Friedman | H04L 67/2842 |

OTHER PUBLICATIONS

Gunda, Laxmikant. et al., "Method for Rapid Detection of Senstive Information in Data Repositories for Duplicate Data," IP.com Publication No. IPCOM000228042D, Jun. 4, 2013.

Weil, Sage et al., "Reliable, Scalable, and High-Performance Distributed Storage: Distributed Object Storage," IP.com Publication No. IPCOM000234957D, Feb. 19, 2014.

Marti Jr., Donald, "Replication Mechanism for a Distributed Version Control System," IP.com Publication No. IPCOM000225058D, Jan. 23, 2013.

Anonymously, "Method to Enable Integrity Check at Secondary Site During Replication," IP.com Publication No. IPCOM000225890D, Mar. 11, 2013.

* cited by examiner

DATA SYNCHRONIZATION IN HIGH AVAILABILITY STORAGE ENVIRONMENTS

BACKGROUND

Field of the Invention

This invention relates to systems and methods for synchronizing data in high availability storage environments.

Background of the Invention

In many storage systems, particularly storage systems that are used for critical databases, file sharing on networks, business applications, or the like, ensuring high availability is critical. For this reason, redundancy is built into many storage systems to ensure that if one or more hardware components fail, other hardware components are available to pick up the workload of the failed components and provide continuous availability. For example, the IBM DS8000® enterprise storage system includes multiple servers to ensure that if one server fails, the other server remains functional to enable I/O to continue between hosts and storage devices. This built-in redundancy helps to reduce the impact that component failures have on organizational operations.

In certain cases, a high availability storage architecture may include a single host system, two gateway devices (e.g., gateway servers), and two data repositories. To provide data redundancy and high availability, the two data repositories may store the same data (e.g., files, objects, etc.). In such a system, the data repositories may need to stay synchronized at all times. This synchronization may be achieved by assuring that a sequence of operations (e.g., open operations, read operations, write operations, delete operations, etc.) that is performed on the data repositories is recorded. This sequence of operations may need to be retrieved and repeated in the event a first data repository becomes unavailable and needs to be resynchronized with the second data repository once the first data repository comes back online. In a high availability storage architecture such as that described above, even if one component (e.g., one gateway server, one data repository, etc.) fails, the high availability storage architecture should be able to provide access to data and recover automatically once the failed component is restored.

In view of the foregoing, what are needed are systems and methods to resynchronize two data repositories in a high availability storage architecture such as that described above. Ideally, such systems and methods can resynchronize data repositories after one data repository goes offline for some amount of time before coming back online.

SUMMARY

The invention has been developed in response to the present state of the art and, in particular, in response to the problems and needs in the art that have not yet been fully solved by currently available systems and methods. Accordingly, embodiments of the invention have been developed to resynchronize data repositories in high availability storage environments. The features and advantages of the invention will become more fully apparent from the following description and appended claims, or may be learned by practice of the invention as set forth hereinafter.

Consistent with the foregoing, a method for resynchronizing data repositories in a high availability storage environment is disclosed. In one embodiment, such a method includes maintaining, in a first gateway server, a first journal that records operations that are performed for a first set of objects while one of first and second data repositories is unavailable. The method further maintains, in a second gateway server, a second journal that records operations that are performed for a second set of objects while one of the first and second data repositories is unavailable. The method communicates, from the first gateway server to the second gateway server, any operations that are performed by the first gateway server for objects in the second set, so that these operations may be recorded in the second journal. The method further communicates, from the second gateway server to the first gateway server, any operations that are performed by the second gateway server for objects in the first set, so that these operations may be recorded in the first journal.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
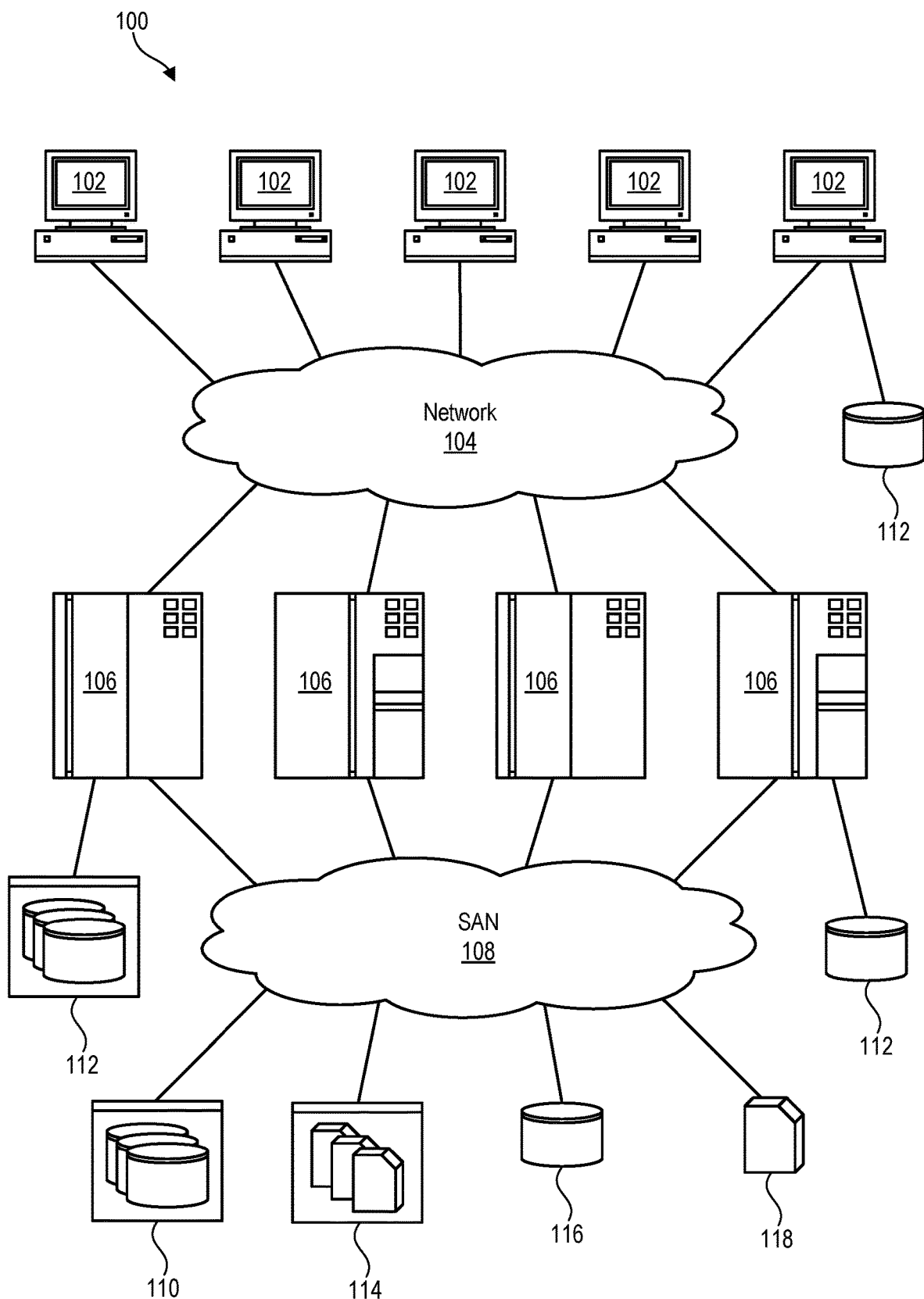
FIG. 1 is a high-level block diagram showing one example of a network environment in which systems and methods in accordance with the invention may be implemented.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage system, a magnetic storage system, an optical storage system, an electromagnetic storage system, a semiconductor storage system, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage system via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention may be described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Referring to FIG. 1, one example of a network environment 100 is illustrated. The network environment 100 is presented to show one example of an environment where systems and methods in accordance with the invention may be implemented. The network environment 100 is presented by way of example and not limitation. Indeed, the systems and methods disclosed herein may be applicable to a wide variety of different network environments in addition to the network environment 100 shown.

As shown, the network environment 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "hosts" 106 or "host systems" 106). In general, the client computers 102 initiate communication sessions, whereas the server computers 106 wait for and respond to requests from the client computers 102. In certain embodiments, the computers 102 and/or servers 106 may connect to one or more internal or external direct-attached storage systems 112 (e.g., arrays of hard-storage drives, solid-state drives, tape drives, etc.). These computers 102, 106 and direct-attached storage systems 112 may communicate using protocols such as ATA, SATA, SCSI, SAS, Fibre Channel, or the like.

The network environment 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems, such as arrays 110 of hard-disk drives or solid-state drives, tape libraries 114, individual hard-disk drives 116 or solid-state drives 116, tape drives 118, CD-ROM libraries, or the like. To access a storage system 110, 114, 116, 118, a host system 106 may communicate over physical connections from one or more ports on the host 106 to one or more ports on the storage system 110, 114, 116, 118. A connection may be through a switch, fabric, direct connection, or the like. In certain embodiments, the servers 106 and storage systems 110, 114, 116, 118 may communicate using a networking standard or protocol such as Fibre Channel (FC) or iSCSI.

Figure 2:
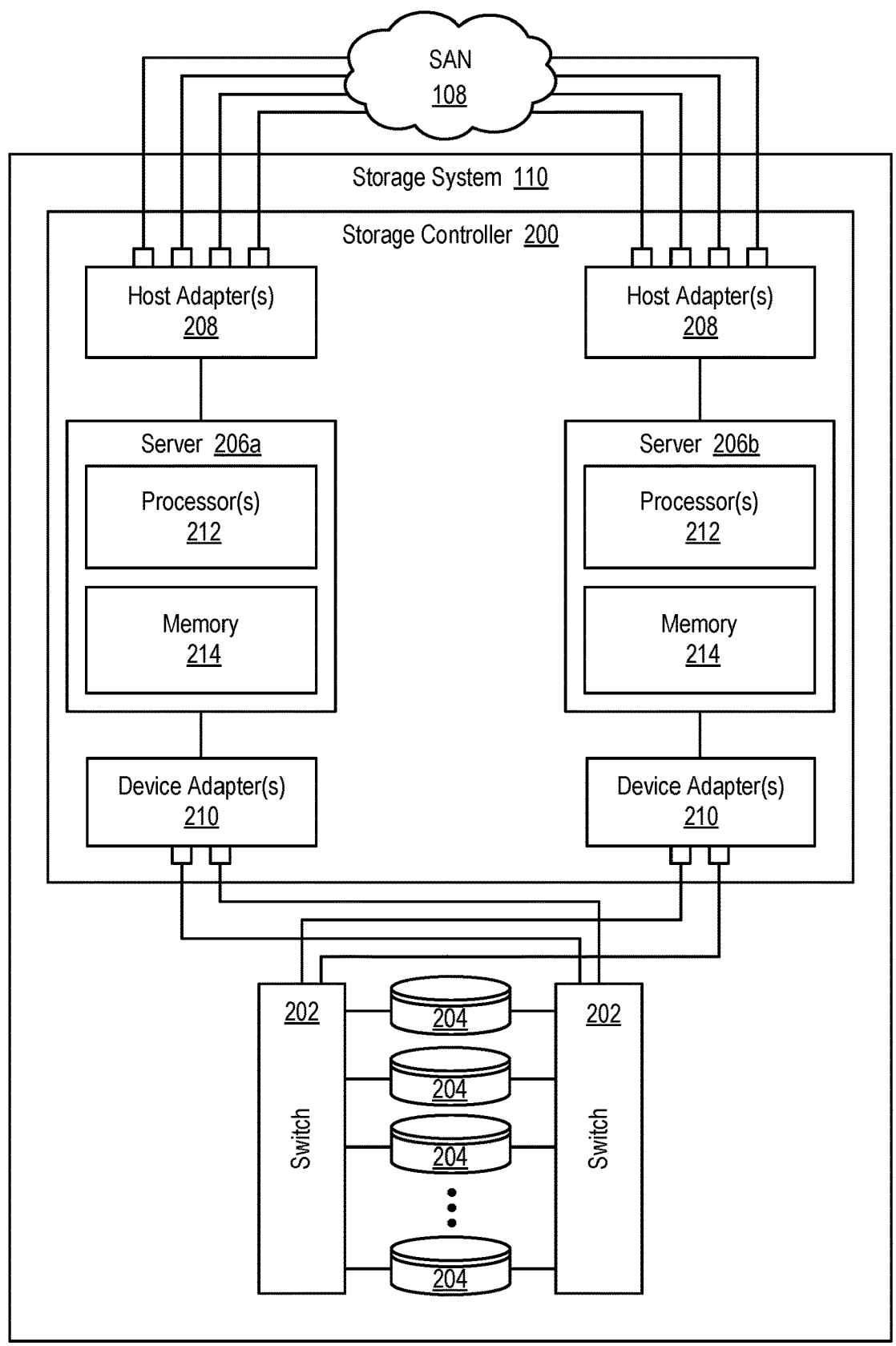
FIG. 2 is a high-level block diagram showing one embodiment of a storage system in the network environment of FIG. 1.

Referring to FIG. 2, one example of a storage system 110 containing an array of hard-disk drives 204 and/or solid-state drives 204 is illustrated. As shown, the storage system 110 includes a storage controller 200, one or more switches 202, and one or more storage drives 204, such as hard-disk drives 204 and/or solid-state drives 204 (e.g., flash-memory-based drives 204). The storage controller 200 may enable one or more hosts 106 (e.g., open system and/or mainframe servers 106 running operating systems such z/OS, zVM, or the like) to access data in the one or more storage drives 204.

In selected embodiments, the storage controller 200 includes one or more servers 206. The storage controller 200 may also include host adapters 208 and device adapters 210 to connect the storage controller 200 to host devices 106 and storage drives 204, respectively. Multiple servers 206a, 206b may provide redundancy to ensure that data is always available to connected hosts 106. Thus, when one server 206a fails, the other server 206b may pick up the I/O load of the failed server 206a to ensure that I/O is able to continue between the hosts 106 and the storage drives 204. This process may be referred to as a "failover."

In selected embodiments, each server 206 may include one or more processors 212 and memory 214. The memory 214 may include volatile memory (e.g., RAM) as well as non-volatile memory (e.g., ROM, EPROM, EEPROM, hard disks, flash memory, etc.). The volatile and non-volatile memory may, in certain embodiments, store software modules that run on the processor(s) 212 and are used to access data in the storage drives 204. The servers 206 may host at least one instance of these software modules. These software modules may manage all read and write requests to logical volumes in the storage drives 204.

One example of a storage system 110 having an architecture similar to that illustrated in FIG. 2 is the IBM DS8000™ enterprise storage system. The DS8000™ is a high-performance, high-capacity storage controller providing disk and solid-state storage that is designed to support continuous operations. Nevertheless, the techniques disclosed herein are not limited to the IBM DS8000™ enterprise storage system 110, but may be implemented in any comparable or analogous storage system 110, regardless of the manufacturer, product name, or components or component names associated with the system 110. Any storage system that could benefit from one or more embodiments of the invention is deemed to fall within the scope of the invention. Thus, the IBM DS8000™ is presented only by way of example and not limitation.

Figure 3:
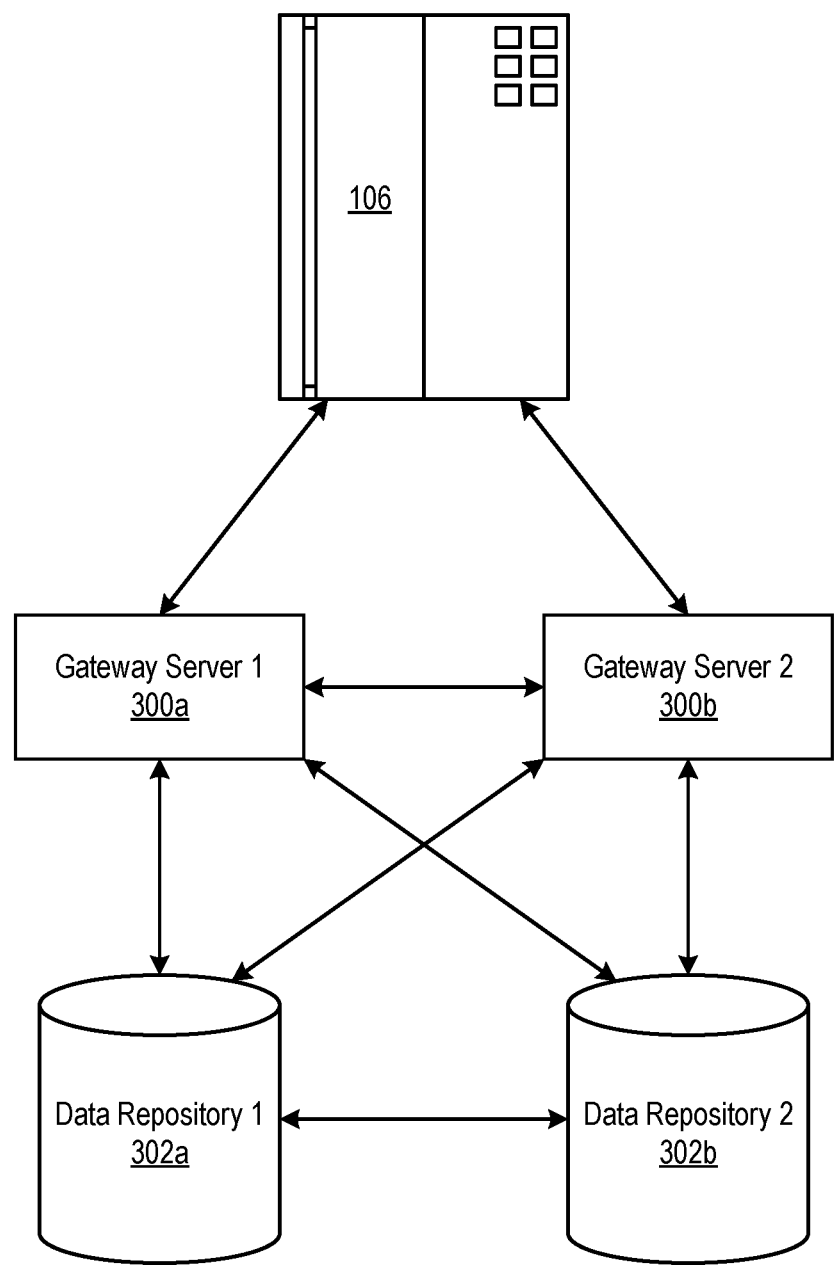
FIG. 3 is a high-level block diagram showing a specific high availability storage environment that includes a host system, first and second gateway servers, and first and second data repositories.

Referring to FIG. 3, in certain embodiments, components such as those illustrated in FIGS. 1 and 2 may be arranged to provide a high availability storage environment, one example of which is shown in FIG. 3. Redundancy may be built into the high availability storage environment to ensure that if one or more components fail, other components are available to pick up the workload of the failed components and provide continuous availability. In the illustrated example, the high availability storage environment includes a host system 106, first and second gateway servers 300a, 300b communicating with the host system 106, and first and second data repositories 302a, 302b communicating with the first and second gateway servers 300a, 300b. In certain embodiments, the gateway servers 300a, 300b are implemented using the servers 206a, 206b in a IBM DS8000™ enterprise storage system. Similarly, in certain embodiments, the data repositories 302a, 302b are implemented using IBM TS7700 virtualization engines that are configured to virtualize physical tape. These are simply examples of components that may be used in the high availability storage environment and are not intended to be limiting. The high availability storage environment may, in certain embodiments, be configured to simulate object storage.

Under normal operating conditions, the host system 106 may perform load balancing by distributing I/O requests (reads and/or writes) between the gateway servers 300a, 300b. In certain embodiments, the host system 106 substantially equally distributes I/O requests between the gateway servers 300a, 300b. In certain embodiments, the data repositories 302a, 302b include a primary data repository 302a and a secondary data repository 302b. The gateway servers 300a, 300b may route read requests to the primary data repository 302a. By contrast, the gateway servers 300a, 300b may route write requests to both data repositories 302a, 302b to ensure that the data repositories 302a, 302b are synchronized with the same data. Thus, a write request that is received by the first gateway server 300a may be executed on the first data repository 302a as well as the second data repository 302b to ensure that both data repositories 302a, 302b contain the same data.

As mentioned above, in certain embodiments, the high availability storage environment is configured to provide object storage. With object storage, the host system 106 may send, to the gateway servers 300a, 300b, instructions in accordance with a selected application programming interface (API) associated with object storage. The instructions may include, for example, open object, read object, write object, delete object, etc. The instructions may also include instructions to create a container to hold particular objects, or delete a container. A container may be needed in order to provide a location from which to read or which to write a particular object to the data repositories 302a, 302b. Using such a system, the host system 106 may direct instructions to the gateway servers 300a, 300b to balance workload therebetween (e.g., by directing a first instruction to the first gateway server 300a and the next instruction to the second gateway server 300b, and so forth). The host system 106 may contain functionality needed to balance the load across the gateway servers 300a, 300b.

Figure 4:
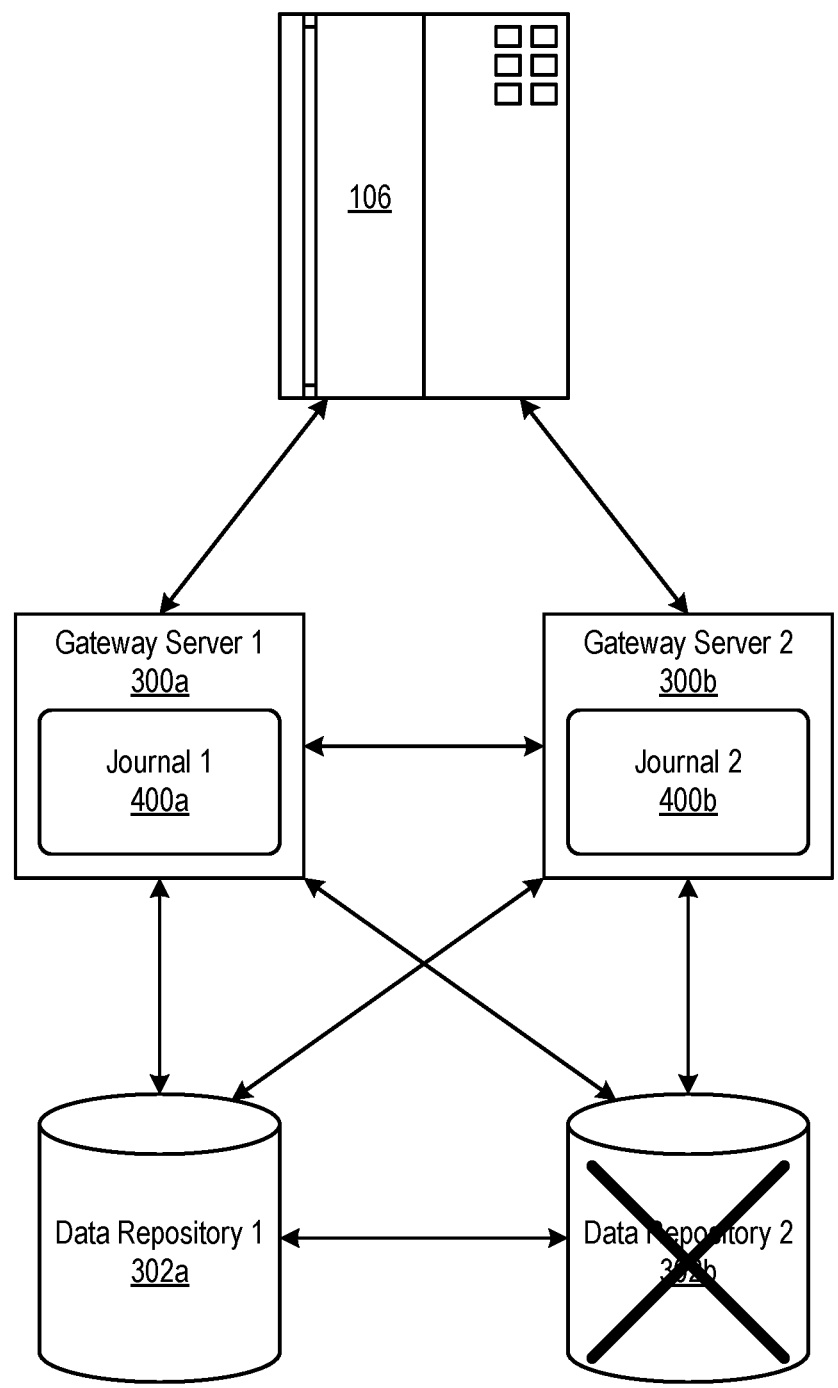
FIG. 4 is a high-level block diagram showing the creation and maintenance of journals in the high availability storage environment of FIG. 3 when one of the data repositories becomes unavailable.

Referring to FIG. 4, using the high availability storage environment, functionality may be needed to ensure that data and containers are synchronized across the data repositories, even when particular data repositories 302a, 302b become temporarily unavailable due to an event such as a failure. When a data repository 302b becomes unavailable, the gateway servers 300a, 300b may be configured to initiate and maintain journals 400a, 400b so that when the unavailable data repository 302b comes back online, operations (creates, writes, deletes, etc.) that were performed on the peer data repository 302a may be performed on the restored data repository 302b so that it can catch up with the peer data repository 302a and have its data/containers synchronized therewith. These operations may need to be completed in the same order in which they were performed on the peer data repository 302a in order to maintain data integrity and/or ensure that data will be synchronized with the peer data repository 302a.

Because each gateway server 300 may maintain its own journal 400, the journals 400a, 400b may need to be coordinated to ensure that operations are performed in a correct sequence when bringing a data repository 302b current with its peer data repository 302a. In order to accomplish this, each journal 400 may be configured to record operations for a certain set of objects in the data repositories 302a, 302b regardless of which gateway server 300 actually performs the operations. For example, the journal 400a of the first gateway server 300a may record operations for a first set of objects in the data repositories 302a, 302b and the journal 400b of the second gateway server 300b may record operations for a second set of objects in the data repositories 302a, 302b. In such an implementation, if the first gateway server 300a performs an operation associated with an object in the second set of objects, the first gateway server 300a may communicate this information to the second gateway server 300b so that the second gateway server 300b may record the operation in its journal 400b. Similarly, if the second gateway server 300b performs an operation associated with an object in the first set of objects, the second gateway server 300b may communicate this information to the first gateway server 300a so that the first gateway server 300a may record this operation in its journal 400a.

Figure 5:
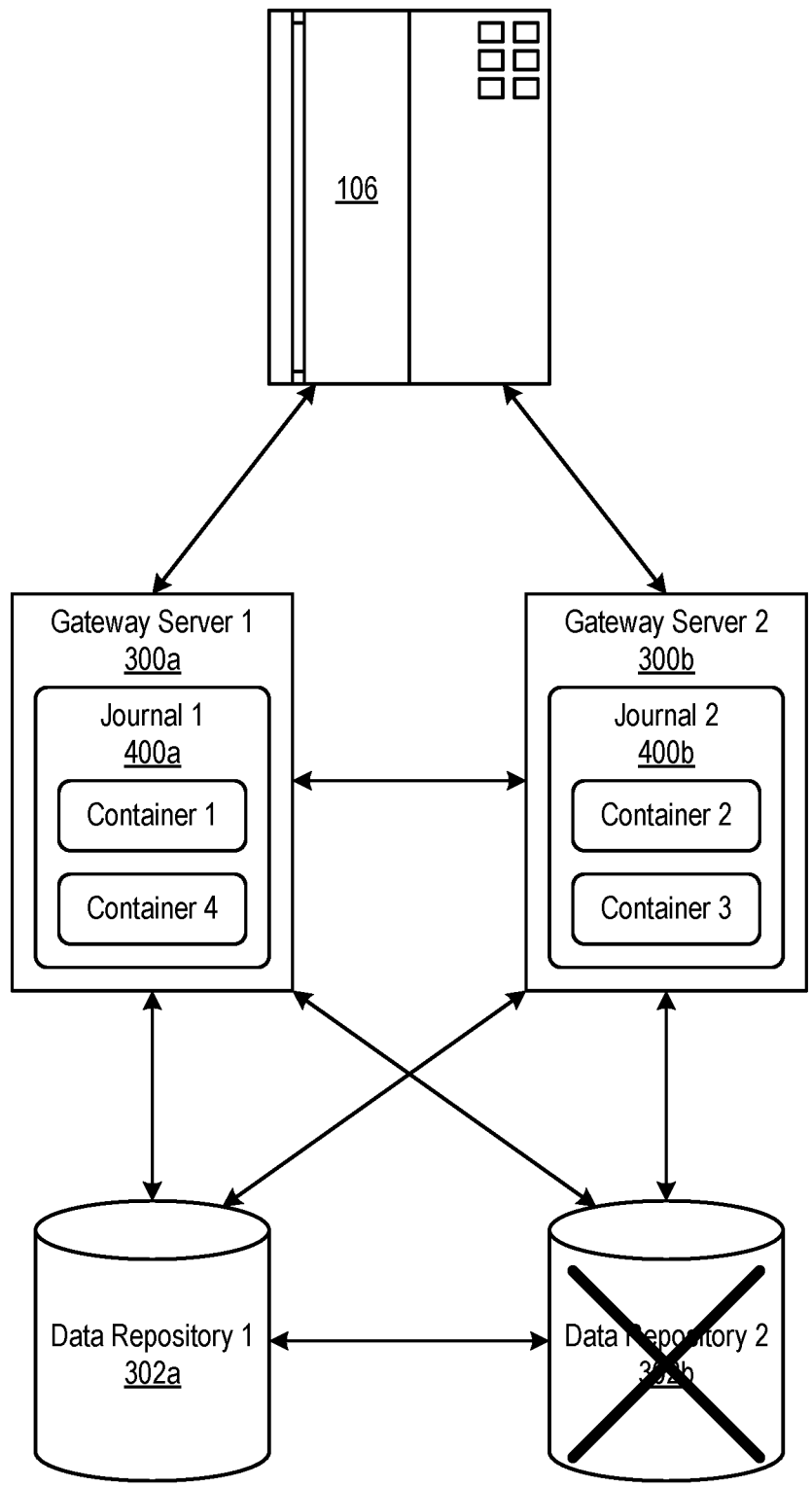
FIG. 5 shows types of information that may be stored in the journals.

Referring to FIG. 5, in certain embodiments, the first set of objects and the second set of objects may correspond to the containers in which they reside. For example, the first journal 400a may record operations for objects in a first set of containers and the second journal 400b may record operations for objects in a second set of containers. For example, as shown in FIG. 5, the first journal 400a records operations for objects in "Container 1" and "Container 4," while the second journal 400b records operations for objects in "Container 2" and "Container 3." Thus, if the first gateway server 300a performs an operation for an object in Container 2, the first gateway server 300a may communicate this information to the second gateway server 300b so that the second gateway server 300b can record it in its journal 400b. Similarly, if the second gateway server 300b performs an operation for an object in Container 4, the second gateway server 300b may communicate this information to the first gateway server 300a so that the first gateway server 300a can record it in its journal 400a. Other techniques for dividing objects into first and second sets (e.g., file path, etc.) may also be used.

Figure 6:
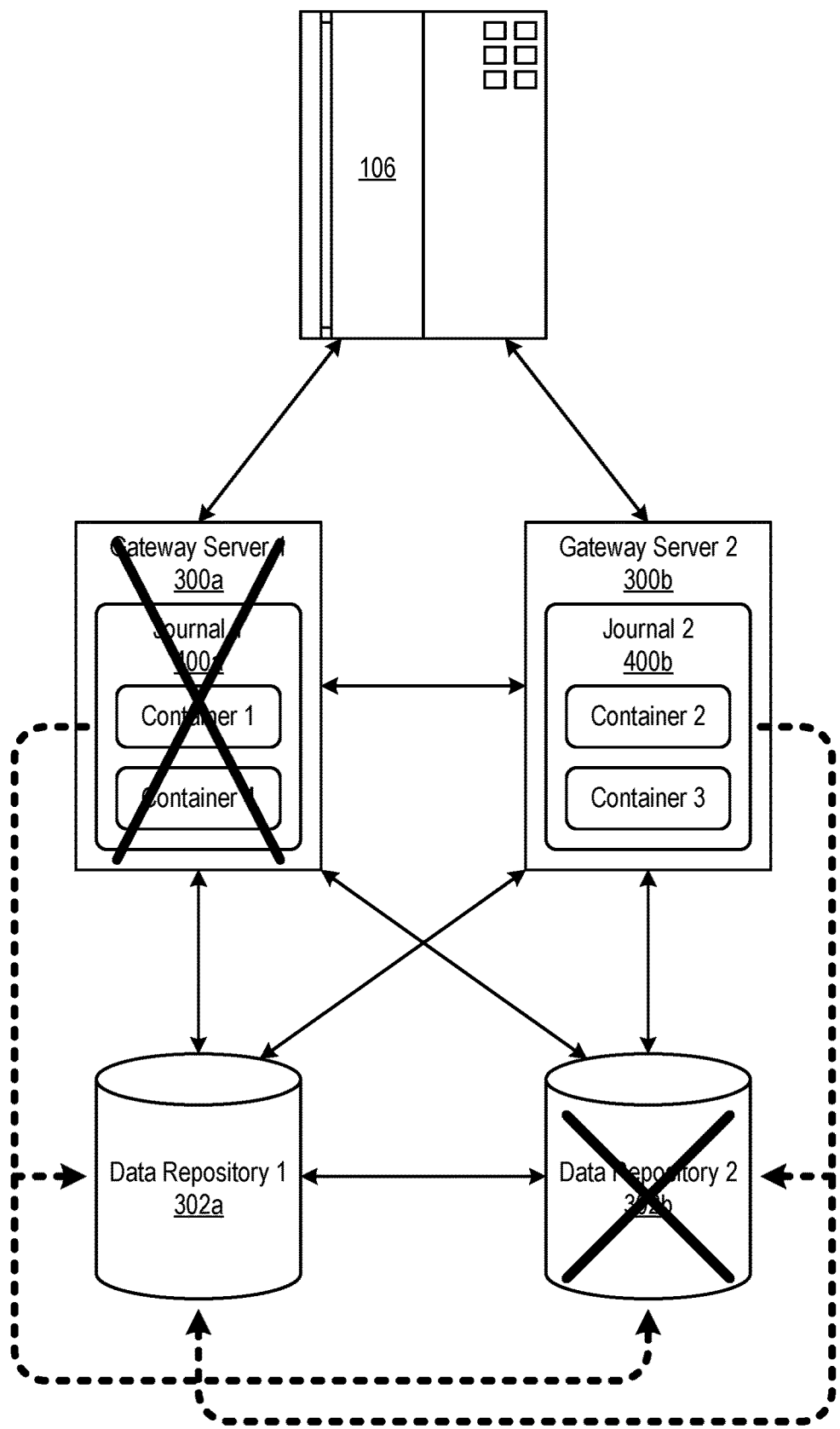
FIG. 6 is a high-level block diagram showing storage of the journals in the data repositories for later retrieval in the event one of the gateway servers becomes unavailable.

Referring to FIG. 6, in certain embodiments, the high availability storage environment may also be configured to deal with the failure of a gateway server 300 in addition to the failure of a data repository 302. In order to deal with such a scenario, while they are online, the gateway servers 300a, 300b may be configured to store their respective journals 400a, 400b in the data repositories 302a, 302b, as shown in FIG. 6. As the journals 400a, 400b in the gateway servers 300a, 300b are updated, the gateway servers 300a, 300b may likewise update the copies of the journals 400a, 400b in the data repositories 302a, 302b. By storing copies of the journals 400a, 400b in the data repositories 302a, 302b, this enables the copies to be retrieved and processed when a data repository 302b comes back online (in order to synchronize the data repository 302b with its peer data repository 302a), even if a gateway server 300a that went down is still unavailable. This technique will also enable the correct order of operations to be maintained when synchronizing the data repositories 302a, 302b.

When a data repository 302b that was unavailable comes back online and a gateway server 300a is still unavailable, the peer gateway server 300b that is available may perform the resynchronization of the data repositories 302a, 302b as set forth above. In doing so, the peer gateway server 300b may first process the journal 400a of the gateway server 300a that is still down, followed by its own journal 400b which may or may not contain entries (i.e., operations) that should have been logged by the gateway server 300a that is down. This will ensure that a correct sequence of operations is maintained.

Figure 7:
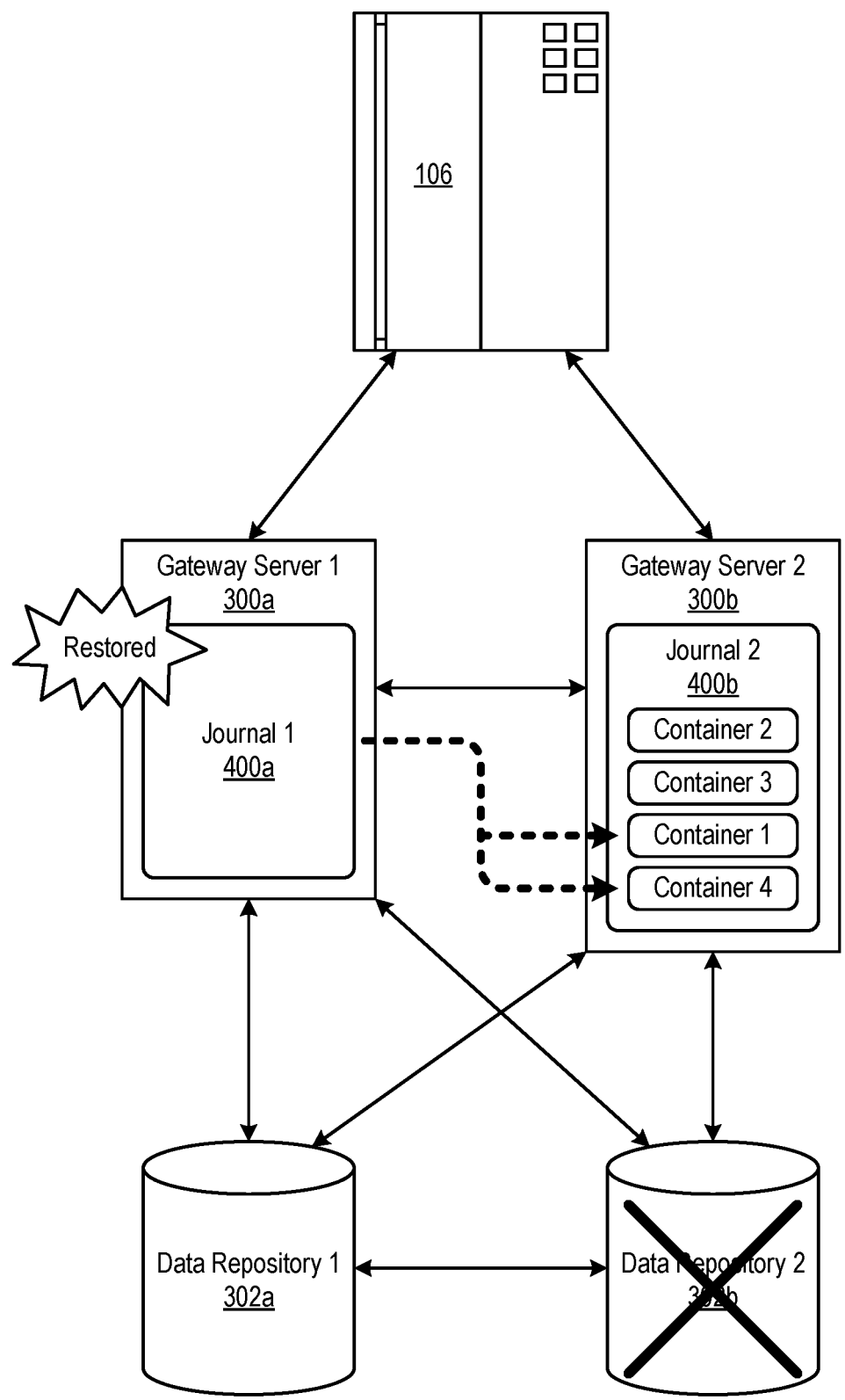
FIG. 7 is a high-level block diagram showing processing of the journals in the event one of the gateway servers becomes unavailable.

While a gateway server 300a is down and its peer gateway server 300b is still performing operations, the peer gateway server 300b may begin to log operations in its journal 400b that, under normal conditions, would be logged in the journal 400a of the gateway server 300 that is down. Upon doing this, the peer gateway server 300b may set an internal flag that indicates that it is logging operations of the other gateway server 300a. If the gateway server 300a comes back online while the data repository 302b is still down, then for each operation performed by the gateway server 300a that is supposed to be logged locally in its journal 400a, the gateway server 300a may query the peer gateway server 300b for the status of the flag. If the flag is set, the gateway server 300a may direct all journal entries to the peer gateway server 300b for logging in its journal 400b, as shown in FIG. 7. After the peer gateway server 300b has finished processing all of its journal entries, thereby synchronizing the data repositories 302a, 302b, it may reset its internal flag. This will cause the gateway servers 300a, 300b to resume operation as set forth in association with FIGS. 3 through 5.

The flowcharts and/or block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for resynchronizing data repositories in a high availability storage environment comprising a host system, first and second gateway servers communicating with the host system, and first and second data repositories communicating with the first and second gateway servers, the method comprising:

maintaining, in the first and second data repositories, a collection of data objects that is synchronized across the first and second data repositories, wherein the collection is divided into a first set of objects and a second set of objects;

maintaining, in the first gateway server, a first journal that records operations that are performed on the first set of objects while one of the first and second data repositories is unavailable;

maintaining, in the second gateway server, a second journal that records operations that are performed on the second set of objects while one of the first and second data repositories is unavailable;

communicating, by the first gateway server to the second gateway server for recording in the second journal, any operations that are performed by the first gateway server for objects in the second set; and communicating, by the second gateway server to the first gateway server for recording in the first journal, any operations that are performed by the second gateway server for objects in the first set.

2. The method of claim 1, further comprising storing copies of the first and second journals in at least one of the first and second data repositories when available.

3. The method of claim 2, wherein storing copies of the first and second journals in at least one of the first and second data repositories comprises updating the copies each time the first and second journals are updated.

4. The method of claim 1, further comprising, in the event the first gateway server fails, retrieving the first journal by the second gateway server.

5. The method of claim 4, further comprising processing, by the second gateway server, operations recorded in the first journal.

6. The method of claim 1, further comprising, in the event the second gateway server fails, retrieving the second journal by the first gateway server.

7. The method of claim 6, further comprising processing, by the first gateway server, operations recorded in the second journal.

8. A computer program product for resynchronizing data repositories in a high availability storage environment comprising a host system, first and second gateway servers communicating with the host system, and first and second data repositories communicating with the first and second gateway servers, the computer program product comprising a computer-readable medium having computer-usable program code embodied therein, the computer-usable program code configured to perform the following when executed by at least one processor:

maintain, in the first and second data repositories, a collection of data objects that is synchronized across the first and second data repositories, wherein the collection is divided into a first set of objects and a second set of objects;

maintain, in the first gateway server, a first journal that records operations that are performed on the first set of objects while one of the first and second data repositories is unavailable;

maintain, in the second gateway server, a second journal that records operations that are performed on the second set of objects while one of the first and second data repositories is unavailable;

communicate, by the first gateway server to the second gateway server for recording in the second journal, any operations that are performed by the first gateway server for objects in the second set; and communicate, by the second gateway server to the first gateway server for recording in the first journal, any operations that are performed by the second gateway server for objects in the first set.

9. The computer program product of claim 8, wherein the computer-usable program code is further configured to store copies of the first and second journals in at least one of the first and second data repositories when available.

10. The computer program product of claim 9, wherein storing copies of the first and second journals in at least one of the first and second data repositories comprises updating the copies each time the first and second journals are updated.

11. The computer program product of claim 8, wherein the computer-usable program code is further configured to, in the event the first gateway server fails, retrieve the first journal to the second gateway server.

12. The computer program product of claim 11, wherein the computer-usable program code is further configured to process, on the second gateway server, operations recorded in the first journal.

13. The computer program product of claim 8, wherein the computer-usable program code is further configured to, in the event the second gateway server fails, retrieve the second journal to the first gateway server.

14. The computer program product of claim 13, wherein the computer-usable program code is further configured to process, on the first gateway server, operations recorded in the second journal.

15. A system for resynchronizing data repositories in a high availability storage environment, the system comprising:

a host system;

first and second gateway servers communicating with the host system;

first and second data repositories communicating with the first and second gateway servers, the first and second data repositories storing a collection of data objects that is synchronized across the first and second data repositories, wherein the collection is divided into a first set of objects and a second set of objects;

the first gateway server configured to maintain a first journal that records operations that are performed on the first set of objects while one of the first and second data repositories is unavailable;

the second gateway server configured to maintain a second journal that records operations that are performed on the second set of objects while one of the first and second data repositories is unavailable;

the first gateway server configured to communicate, to the second gateway server for recording in the second journal, any operations that are performed by the first gateway server for objects in the second set; and the second gateway server configured to communicate, to the first gateway server for recording in the first journal, any operations that are performed by the second gateway server for objects in the first set.

16. The system of claim 15, wherein the first and second gateway servers are configured to store copies of the first and second journals in at least one of the first and second data repositories when available.

17. The system of claim 16, wherein storing copies of the first and second journals in at least one of the first and second data repositories comprises updating the copies each time the first and second journals are updated.

18. The system of claim 15, wherein the second gateway server is configured to retrieve the first journal in the event the first gateway server fails.

19. The system of claim 18, wherein the second gateway server is configured to process operations recorded in the first journal.

20. The system of claim 15, wherein the first gateway server is configured to retrieve the second journal in the event the second gateway server fails.

* * * * *